Oct. 26, 1948.  C. N. CONE  2,452,226
LAMINATED PRODUCT AND METHOD OF MANUFACTURE
Filed June 15, 1944
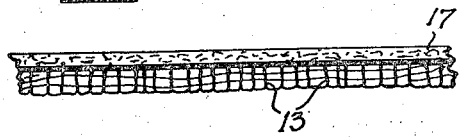
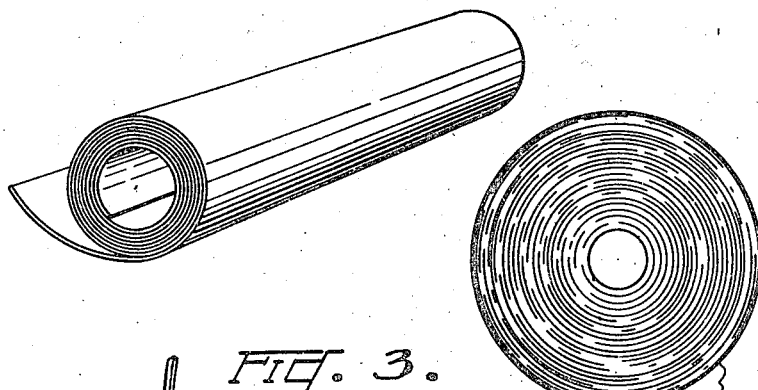
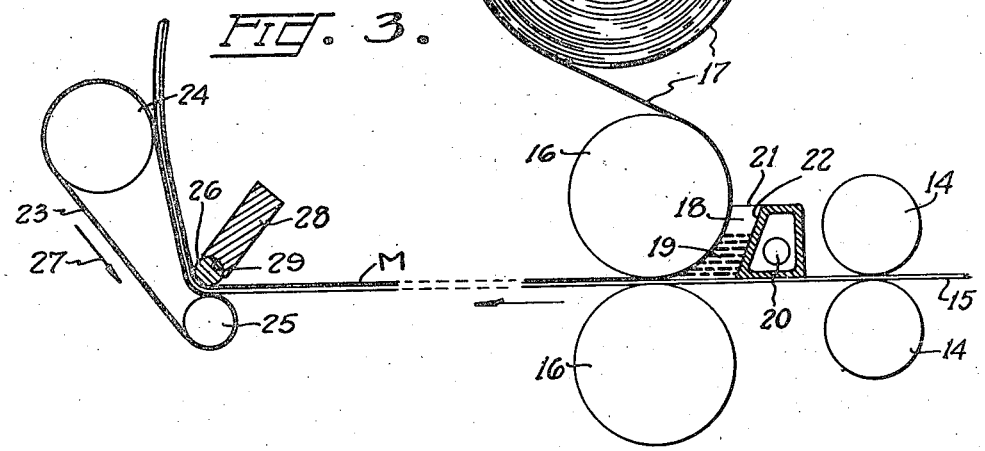
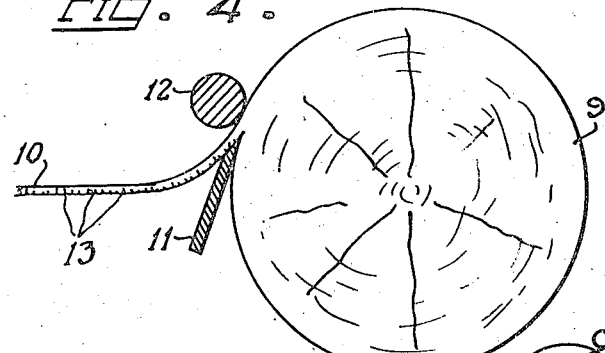
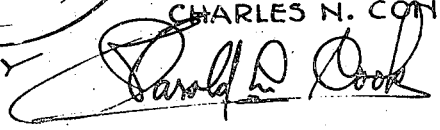
INVENTOR
CHARLES N. CONE
BY
ATTORNEY Patented Oct. 26, 1948

2,452,226

UNITED STATES PATENT OFFICE 2,452,226

LAMINATED PRODUCT AND METHOD OF MANUFACTURE

Charles N. Cone, Portland, Oreg., assignor to M and M Wood Working Company, Portland, Oreg., a corporation of Oregon Application June 15, 1944, Serial No. 540,388

13 Claims. (Cl. 154—132)

This invention relates to a laminated or multiply material comprising at least three plies, each ply having peculiar and characteristic qualities which distinguish it from each of the other plies, and which, when combined in interfacial relation, produces a completed structure having new and unusual properties.

The invention is particularly applicable to laminated structures comprising at least one ply of rotary cut wood veneer. In proportion to their weight wood veneers possess great strength and rigidity, particularly in the direction of the grain. Across the grain the strength of the wood is impaired by the presence of an infinite number of fractures created at the time the veneer is peeled from the log and commonly referred to as lathe checks. As the sheet of veneer is cut from the log and is caused to lie flat, that side or face of the veneer which was innermost on the log is caused to split in an infinite number of places in a pattern following the grain of the wood, but few of these splits, however, extending through the veneer to its outer face. Wood veneers have heretofore been employed principally in the manufacture of plywood, wherein a plurality of veneers are united interfacially, with the grain of each ply of veneer disposed at right angles to the grain of each adjacent ply, the plies being bonded together to form a panel having great strength, rigidity and flatness.

Although for many applications the flatness and rigidity obtained through plywood construction is of great importance, there are a host of equally important applications where the well known structural virtues of wood (strength, rigidity, lightness, easy working with tools, etc.) can best and most conveniently be utilized by incorporating a single sheet of veneer into a construction in which the tensile strength of the veneer is greatly reenforced, particularly in the direction across the grain of the veneer, but in which the rigidity in the direction across the grain is further diminished so that in this direction the construction is comparatively flexible and limp, so that it may readily be formed into a roll for greater ease of transportation and application. In the instant invention is provided a laminated structure embodying a single sheet of wood veneer and having incorporated therein the strength of the wood as measured by its resistance to impact and compression, and which, although being limp and flexible in the direction across the grain, retains its rigidity and tensile strength in the direction of the grain.

Rotary cut wood veneer is characterized by slash grain, that is, it presents a surface which is roughly parallel to the annual rings of the log. The lathe knife cuts through these rings at a very slanting angle, and the alternate rings of soft porous spring wood and dense hard summer wood are displayed in a broad and irregular pattern. As the veneer comes from the log its surface is rough and uneven, and as the veneer dries this roughness is accentuated, due to the fact that the soft or porous spring wood, being the more responsive to changes in moisture content, shrinks away from the hard summer wood, leaving the pattern of the hard summer wood in bold relief on the surface of the veneer. Ordinarily the first step in finishing a plywood panel is to give it a smooth surface, usually by sanding. However, especially in the wood of conifers such as Douglas fir, in which there is a marked difference in denseness and hardness between the spring and summer growth, sanding fails to produce a satisfactorily smooth surface. The alternating soft and hard areas of the surface respond differently to the pressure of the sandpaper and to subsequent changes in moisture content, causing the pattern of the grain to emerge. Consequently, even though several coats of paint or enamel be applied to the sanded surface, the underlying pattern of the grain of the veneer will be apparent on the surface. Furthermore, sanding involves cutting away and discarding about $\frac{1}{16}$ of an inch of the total thickness of the panel, and this, in the case of panels which are to be finished $\frac{1}{4}$ of an inch thick, means a loss of about 20% of the total wood contained in the unsanded panel. The present invention provides a means whereby a smooth surface is imposed upon the wood veneer without sanding or otherwise cutting away any of the wood.

In a structure embodying the instant invention, an essential element is a ply of an anhydrous, thermoplastic, water repellant material applied to at least one surface of the wood veneer and being capable of bonding itself thereto. For reasons which presently will be explained, it is to be desired that this material be flexible at ordinary temperatures, in that it should be responsive to or readily adjustable to meet the requirements of changing conditions, particularly as regards movements involving changes in moisture content of the materials which constitute the other plies of the structure. It is important that this element of the structure be capable of becoming highly fluid at an elevated temperature in order that it will conform to the irregular surface of the wood and penetrate sufficiently into the cellular structure of the wood and of the surface element to bond itself to each of these elements. For this purpose asphalt, having a melting point at about 190° F. (as determined by the ring and ball method), may be used. The asphalt may be applied to the wood veneer at a temperature of the order of 300° to 350° F., at which temperature it is of sufficient fluidity to create a satisfactory bond with the wood. The plasticity of the asphalt at the time of contact with the wood permits it to conform to the rough irregular surface of the wood and to fill and seal existing openings in the wood such as splits, checks and small knot holes.

It is the teaching of the instant invention that the asphalt is applied in interfacial relation to the wood veneer as a distinct element of a laminated structure comprising the asphalt as one continuous ply thereof. A sufficient amount of the asphalt is applied to compensate for the rough unsanded surface of the wood and to produce a flat level surface superimposed thereover. It is important that the asphalt used for this ply of the structure have sufficient flexibility and elasticity at ordinary temperatures so that flexing of the structure as a whole or expansion and contraction of the wood veneer with changing moisture content will not break the continuity of the asphalt ply and so impair its usefulness as a moisture barrier, nor break the bond between the constituent plies of the structure.

The third element or ply of the herein described structure comprises a sheet of fibrous cellulosic material felted together into a sheet having the characteristics of paper. Because of the high tensile strength and flexibility of paper, it is admirably adapted for use as a structural element in a laminated material embodying the instant invention. Such a structure may consist of a single ply of wood veneer, a ply of fibrous cellulosic material felted together into a sheet of paper, and a ply of a thermoplastic, water repellent material of a thickness sufficient to compensate for irregularities in the surface of the wood and to provide a flat level surface to which the paper is bonded, the thermoplastic material penetrating sufficiently into the cellulosic structure of the wood and of the paper to bond itself to each of these elements.

The various features of novelty which characterize the instant invention will be pointed out in the appended claims; but for a full understanding of the invention reference may be had to the following detailed description, taken in connection with the accompanying drawings, wherein:

Figure 1 is a perspective view of a laminated structure embodying the instant invention; Figure 2 is a fragmentary elevation on an enlarged scale of the structure illustrated in Figure 1; Figure 3 is a generally schematic elevation of an apparatus for making a laminated structure embodying the invention, the fracturing apparatus shown at the left of the broken double lines being either an integral part of the laminating machine or a separate structure, as may be desired; and Figure 4 is a representation of the manner in which the veneer is cut from a log in a lathe.

It is common practice in a plywood mill to provide a mill pond in which logs are floated until such time as they are placed on the lathe for the production of wood veneer. For this reason the moisture content of the wood veneer as it comes from the log may be relatively high. In practicing the method of the instant invention, wood veneer may be employed at a moisture content equal to or slightly in excess of its fiber saturation point without the necessity of an intermediate drying step. For example, Douglas fir heart wood veneer may be employed at the moisture content at which it comes from the lathe. It is preferable that defects such as large knot holes, pitch seams and the like be removed and solid patches inserted in place thereof, and that the sections of clear veneer, if less than merchantable length, be secured together in edge to edge relation to make a continuous sheet, although for material intended for many uses the presence of such defects is not objectionable.

As the veneer is cut from the log and caused to lie flat, the surface of the veneer which was innermost on the log is split or ruptured in an infinite number of places in a pattern following the grain of the wood. This fractured or ruptured surface is referred to as the loose side of the veneer. The structure of the veneer as it comes from the log is shown in Figure 4, wherein is shown a log 9 illustrated as being supported in a lathe (not shown) and showing a sheet of veneer 10 being cut from the log by means of a knife 11 acting in conjunction with a pressure roller 12. The loose side of of the veneer is characterized by the presence of innumerable fissures 13, hereinbefore referred to as lathe checks, these being of less depth than the thickness of the veneer so that an unsanded veneer is also characterized by one surface made up of a relatively continuous layer of unbroken wood, commonly referred to as the tight side of the veneer. On the tight side of the veneer the tensile strength of the wood in the direction across the grain is relatively unimpaired, whereas on the loose side of the veneer it is greatly impaired. A sheet of wood veneer will bend across the grain much more easily toward the tight side for the reason that the loose side is comprised of an infinite number of fissures which open up in response to any tension placed on the loose side of the veneer.

In the structure embodying the instant invention it is preferred that the loose side of the veneer ply comprise one face of the laminated material and that the paper ply comprise the other face of the material. In the event the paper is intended as the obverse surface of the laminated structure, it is desirable that the paper have a smooth, hard, scuff resistant surface, and that fibers which tend to protrude above the surface be laid flat. The paper provides a surface which is homogeneous and neutral in character and which, being porous, is suitable for receiving various types of wall finish such as paint, enamel, calsomine, wallpaper, etc. Although paper has little resistance to compressive forces, it is remarkably strong under tension and contributes considerably to the strength of the completed structure. It will be appreciated that the plies of asphalt and paper may be relatively thin, the bulk of the thickness residing in the wood veneer.

In the manufacture of a laminated structure embodying the instant invention, the assembly of wood veneer, asphalt and paper may be fed between a pair of pressure members which apply sufficient pressure to make a bonding contact between the asphalt and the rough irregular surface of the wood veneer and to lay the paper down in a smooth plane surmounting the ply of asphalt. The plasticity of the asphalt at the time of contact permits, first, conformation of the asphalt to the irregular surface of the wood, and, second, perfect leveling of the sheet of paper surmounting the asphalt.

As the leading edge of the wood veneer enters between the pressure members, the end of the sheet of paper is also led between the pressure members and caused to overlie one face of the wood veneer. As the assembly of wood veneer and paper enters between the pressure members, asphalt, at a sufficiently elevated temperature to be in a fluid condition, is caused to flow between the sheet of paper and the adjacent face of the wood veneer to form a ply therebetween of a thickness permitted by the spacing of the pressure members.

Referring to Figure 3 of the drawings, feed rolls 14—14 are shown as feeding a ply of wood veneer 15, with the tight side uppermost, between a pair of pressure rolls 16—16. Mounted at an elevation somewhat above the pressure rolls 16—16 is a roll of paper 17 from which the paper is unrolled in a continuous sheet and fed between the upper pressure roll 16 and the tight side of the wood veneer 15. The sheet of paper 17 passes around and under the upper pressure roll 16 in such manner as to form one side of a trough 18 adapted to contain asphalt 19 in a fluid condition. A heating element 20 is mounted in the wall of the trough 18 and extends lengthwise of the trough to maintain the fluidity of the asphalt. The trough 18 is provided with ends 21 and a sidewall 22, but the bottom thereof is formed by the advancing sheet of wood veneer 15. Asphalt is supplied to the trough after the end of the wood veneer 15 has come into registry therewith. The side wall 22 of the trough is made to slope toward the point where the sheet of paper 17 and the wood veneer 15 enter the nip of the pressure rolls 16, at which point the fluid asphalt flows onto the wood veneer and into the space between the veneer 15 and the paper 17 in an amount which is determined by the spacing of the pressure rolls 16. The downward travel of the paper forming one wall of the trough 18, and the forward movement of the wood veneer 15 forming the bottom of the trough, together tend to pull asphalt 19 into the space between the paper and the wood veneer in a quantity sufficient to compensate for irregularities in the surface of the wood and to produce a flat level surface to which the paper is bonded. The flow of asphalt into the space between the paper and the wood veneer forces those two elements apart a distance permitted by the spacing of the pressure rollers to produce a laminated structure having an overall thickness equal to the distance which said pressure rolls are spaced apart.

As the assembly of wood veneer and paper passes between the pressure rolls 16—16, sufficient pressure is exerted by the assembly against the pressure rolls to cause the asphalt to penetrate sufficiently into the cellular structure of the wood veneer and of the sheet of paper to bond the asphalt thereto. The plasticity of the asphalt at the time of contact with the other elements of the structure insures, first, the conformation of the asphalt to the irregular surface of the wood, and, second, the leveling of the sheet of paper surmounting the asphalt. The plasticity of the asphalt is due to its elevated temperature. When it cools it becomes comparatively rigid, though, for purposes of the instant invention, it is preferable that the asphalt used as the intermediate ply in the instant structure be characterized by a fair degree of flexibility and elasticity at ordinary temperatures. Contact with the wood and paper cools the asphalt with sufficient rapidity that it is relatively nonfluid when the assembled structure is discharged from between the pressure rolls, the asphalt having properties of binding the structure together and thus supporting the paper in a flat level plane in spaced apart superimposed relation over the irregular surface of the wood.

In Figure 3, to the left of the double broken line is illustrated a machine for progressively rupturing the veneer to cause the greater number of the lathe checks to extend through the veneer to the thermoplastic, water repellent ply. These fissures have their inception when the veneer is cut from the log. In fact, if the pressure roller 12 is removed from the lathe, the lathe checks in the sheet of veneer cut from the log are so accentuated that the greater number thereof are caused to extend through the veneer or so nearly through the veneer that subsequent stresses imposed on the veneer when the laminated material is dried causes rupturing of the veneer along the lines of the lathe checks. Veneer cut in this manner, however, is fragile and considerable breakage occurs in handling, so that for practical purposes the veneer is cut from the log in the usual manner and the lathe checks are extended completely through the veneer in the direction of its thickness by the action of the machine illustrated to the left of the double broken line in Figure 3. They run parallel to the wood fibers and follow the contour lines of the grain, and, therefore, do not impair the strength of the veneer in the direction of the grain. The spacing between these fissures, in the direction across the grain of the wood, is of the order of about ⅛ to ¼ of an inch. The machine comprises a broad endless belt 23 trained around rollers 24 and 25. Mounted above and closely adjacent the roller 25 is a breaker roller 26 having a diameter of the order of one inch and so positioned as to press upon the working run of the belt 23. The roller 24 is mounted above and slightly to one side of the roller 26 so that the belt 23, traveling in the direction of the arrow 27, moves upwardly around the breaker roller 26. A bar 28, overlying the breaker roller 26, is provided with a concave edge 29 conforming to the curvature of the roller 26, the bar 28 functioning solely to maintain the longitudinal axis of the breaker roller 26 in a horizontal plane.

The laminated material M is fed into the machine beneath the breaker roller 26 and is pulled around the roller 26 by movement of the belt 23. In passing under the breaker roller 26 the veneer is fractured in a pattern closely conforming with the grain of the wood so as to accentuate the ease with which the material may be bent or rolled.

After being treated in the fracturing machine the material may be placed in a drying tunnel or kiln to reduce its moisture content, after which it may be formed into rolls for storage and shipment.

The wood supplies ample strength in the direction of its grain, but is relatively weak across the grain. A high degree of tensile strength across the grain of the wood is supplied by the paper. Strength across the grain is also supplied by the ply of asphalt which, being elastic, holds each fragment of the wood in mesh with the rupture contour of adjacent fragments between which it lies. It will be appreciated that in few, if any, instances is the wood veneer split entirely across its width so that, due to the elasticity of the asphalt ply which holds the wood fragments in mesh with the rupture contour of adjacent fragments, the structure possesses a measurable strength in the direction across the grain of the wood in addition to that supplied by the paper ply.

An important advantage of the instant invention springs from the fact that the laminated structure has dimensional stability. This stability is achieved by virtue of the numerous closely spaced fissures extending along the grain of the wood and extending through the thickness of the wood veneer ply. The asphalt ply does not change its dimensions with changing moisture conditions; therefore, the overall dimension of the laminated structure does not change, the above mentioned fissures serving as expansion joints which provide space to take up the movement of the wood ply relative to the asphalt ply caused by swelling or shrinking of the wood.

It is the teaching of this invention that asphalt, in spite of its outstanding moisture repelling character, will, under the conditions specified herein, bond itself strongly to wet wood veneer containing an amount of moisture more than sufficient to produce maximum swelling of the veneer. When the wood veneer subsequently dries, although it shrinks greatly, it does not pull itself loose from the asphalt ply, which does not shrink, the asphalt being sufficiently elastic to compensate for changes in moisture content of the wood veneer. Thus, if the wood veneer contains moisture equal to or slightly in excess of its fiber saturation point at the time when the plies are united, and the veneer is fractured in a pattern of fissures running parallel to and following the contour of the grain of the wood, and extending through the thickness of the wood veneer ply, then when the product is dried this multitude of closely spaced fissures open up in the wood veneer, the adjacent filaments of the wood along these fissures pulling away from each other to the extent induced by the shrinkage of the wood cells in drying. The overall length of the structure in the direction across the grain of the wood remains undiminished due to the non-shrinking character of the asphalt ply and the ability of the wood and asphalt plies to remain bonded together during shrinkage of the wood ply. In the event the structure, after drying, becomes saturated with water, the expansion of the wood in the direction parallel to the plane that joins the two plies is taken up within the closely spaced fissures, which extend through the thickness of the wood ply and constitute a multitude of expansion joints. Since the veneer ply, when joined to the asphalt ply, preferably contains an amount of moisture equal to or slightly in excess of its fiber saturation point, and since fiber saturation is the moisture content of maximum swelling, it follows that the wood ply may subsequently become saturated with water without expanding beyond its original overall dimension (this dimension being the same as that of the asphalt ply) without affecting the flatness of the surface of the completed structure.

It is preferred that the product be laid flat during the drying step so that the ply of wood veneer is not subject to either tensile or compressive forces which might tend to distort the wood cells during changes in their moisture content.

By reason of the peculiar properties flowing from a combination of dissimilar elements, the structure is applicable for a wide range of uses, it being intended that the invention shall not be limited in breadth or scope except as required by the prior art and the appended claims.

Having now described my invention and in what manner the same may be used, what I claim as new and desire to protect by Letters Patent is:

1. A laminated structure comprising at least three plies of dissimilar materials, one of the outer of said plies consisting of rotary cut wood veneer containing a multitude of closely spaced fissures in its outer surface extending through the thickness of the veneer and running parallel to the grain of the wood but not destroying the tensile strength of the wood fibers, the other outer ply consisting of a fibrous cellulosic material felted together into a sheet of paper and possessing relatively great tensile strength, and an intermediate ply bonded to each of said first two plies and consisting of asphalt characterized by flexibility and elasticity at ordinary temperatures and providing for movement of the segments of wood veneer between said fissures in response to changes in moisture content of the wood without changing the dimension of any of said plies comprising the laminated structure, said intermediate ply having varying thickness compensating for irregularities in the wood veneer and providing a flat level surface superimposed thereover, said laminated structure having a thickness greater than the combined thickness of the wood veneer and paper plies.

2. A laminated structure comprising a ply of wood veneer having a multiplicity of closely spaced fissures extending through the thickness thereof, a ply of paper, and an intermediate ply of an anhydrous thermoplastic material disposed between said veneer and said paper, said ply of thermoplastic material being of a thickness sufficient to fill depressions in the surface of said wood veneer and to provide a flat level surface therefor and being capable of bonding itself to each said wood veneer and paper plies and providing for movement of the segments of wood veneer between said fissures in response to changes in moisture content of the wood without changing the dimension of any of said plies comprising the laminated structure, said laminated structure having a thickness greater than the combined thickness of the wood veneer and paper plies.

3. A laminated structure comprising at least three plies of dissimilar materials, one of said plies consisting of wood veneer having a multiplicity of closely spaced fissures extending through the thickness thereof and having relatively great rigidity in a direction parallel to the grain of the wood and being flexible across the grain of the wood, one of said plies consisting of a fibrous cellulosic material felted together into a sheet having the characteristics of paper, and the other ply consisting of an anhydrous thermoplastic material bonded to each of said first two plies and having properties of flexibility and elasticity at ordinary temperatures and having dimensional stability in the presence of water, and providing a plastic base for segments of wood veneer between said fissures and permitting movement of the segments of wood veneer between said fissures in response to changes in moisture content of the wood ply.

4. A laminated structure comprising at least three plies of dissimilar materials, one of said plies consisting of a segmented ply possessing great strength and rigidity in one direction and being limp and flexible in another direction, a second of said plies consisting of a fibrous cellulosic material felted together into a sheet having the characteristics of paper, and the remaining ply consisting of an anhydrous thermoplastic material having properties of flexibility and elasticity at ordinary temperatures and having dimensional stability in the presence of water, and providing a plastic base for the segmented ply and permitting movement of said segments in response to changes in moisture content of the segmented ply.

5. The method of making a laminated material comprising providing a ply of wood veneer having a pattern of closely spaced fissures following the grain of the wood and extending through the veneer in the direction of its thickness, said veneer having a relatively high moisture content, and a ply of paper, flowing asphalt between said wood veneer and said paper in an amount sufficient to provide a continuous ply of asphalt having a flat level surface superimposed over one face of said veneer, said asphalt providing a plastic base for segments of wood between said fissures and permitting movement of the segments of wood between said fissures in response to changes in moisture content of the wood ply, and thereafter drying said material for reducing the moisture content of said ply of wood veneer.

6. The method of making a laminated material comprising uniting in interfacial relation a ply of wet wood veneer, a ply of asphalt and a ply of a fibrous cellulosic material felted together into a sheet of paper, said asphalt ply being capable of bonding itself to said plies of wood veneer and paper for holding the several plies of said material together in interfacial relation and providing a plastic base for the veneer ply, rupturing said ply of wood veneer for providing a pattern of closely spaced fissures following the grain of the wood and extending through the thickness of the veneer and constituting a multitude of expansion joints providing for contraction and expansion of the veneer ply due to subsequent changes in its moisture content, and subsequently drying said material.

7. The method of making a laminated structure comprising feeding a ply of wood veneer and a ply of paper through a pressing zone, maintaining a quantity of fluid asphalt adjacent the infeed side of said pressing zone in position to flow between said wood veneer and said paper, said quantity of asphalt being in excess of the amount permitted to flow between the plies of wood veneer and paper entering said zone, flowing said asphalt between said plies of wood veneer and paper for adhering said plies together and for providing an intermediate ply of asphalt having sufficient thickness to press said plies of wood veneer and paper apart the distance permitted by said pressing zone, and rupturing said ply of wood veneer for providing a pattern of closely spaced fissures following the grain of the wood, and causing said fissures to extend through the thickness of the wood veneer for creating a multitude of expansion joints providing for contraction and expansion of the wood veneer due to subsequent changes in its moisture content.

8. A laminated structure comprising at least three plies of dissimilar materials, one of said plies consisting of wood veneer possessing great strength and rigidity in the direction of the grain of the wood and having a multiplicity of closely spaced fissures running parallel to the grain of the wood and extending through the thickness of said veneer, said fissures comprising expansion joints permitting relative movement of the segments of wood veneer lying between said fissures due to changes in moisture content thereof, a second of said plies consisting of a fibrous cellulosic material felted together into a sheet of paper and possessing relatively great tensile strength, and an intermediate ply bonded to each of said first two plies and consisting of asphalt characterized by flexibility and elasticity at ordinary temperatures and providing for movement of the segments of wood veneer between said fissures in response to changes in moisture content of the wood without changing the dimension of any of said plies comprising the laminated structure.

9. A laminated structure comprising at least three plies of dissimilar materials, one of said plies consisting of wood veneer possessing great strength and rigidity in the direction of the grain of the wood and having a multiplicity of closely spaced fissures running parallel to the grain of the wood and extending through the thickness of said veneer, said fissures comprising expansion joints permitting relative movement of the segments of wood veneer lying between said fissures due to changes in moisture content thereof, a second of said plies consisting of a fibrous cellulosic material felted together into a sheet of paper and possessing relatively great tensile strength, and an intermediate ply bonded to each of said first two plies and consisting of asphalt characterized by flexibility and elasticity at ordinary temperatures and providing for movement of the segments of wood veneer between said fissures in response to changes in moisture content of the wood without changing the dimension of any of said plies comprising the laminated structure, said intermediate ply having varying thickness compensating for irregularities in the wood veneer and providing a flat level surface superimposed thereover, said structure having a thickness greater than the combined thickness of the wood veneer and paper plies and being rollable on an axis extending in the direction of the grain of the wood ply.

10. The method of making a laminated structure comprising feeding a ply of wood veneer and a ply of paper through a pressure zone, feeding fluid asphalt into said pressure zone between said wood and paper to press said plies apart to a predetermined outside thickness, and rupturing said wood veneer in closely spaced fissures following the grain of the wood, and causing said fissures to extend through the thickness of the veneer.

11. The method of making a laminated structure comprising feeding a ply of wood veneer and a ply of paper through a pressing zone, feeding fluid asphalt into said pressing zone between said wood and paper to press said plies apart to a predetermined outside thickness, and then bending said structure around a short radius of curvature with the wood ply outermost to rupture said veneer in closely spaced fissures following the grain of the wood so that the thickness of asphalt causes said veneer to bend on a longer radius than said paper to separate said fissures on the inner face of the veneer into expansion joints extending through the thickness of the veneer.

12. A laminated structure comprising a ply of paper, a ply of wood veneer containing closely spaced collateral fissures extending through the thickness thereof, and an intermediate ply of anhydrous plastic material filling the irregularities of the wood surface to form a true plane surface in contact with said paper and providing plastic support for areas of wood between said fissures to accommodate moisture responsive expansion and contraction of said wood areas between said fissures as expansion joints without changing the dimensions of said structure.

13. A laminated structure comprising a ply of paper, a ply of wood veneer containing closely spaced collateral expansion joints extending through the thickness thereof, and a plastic support for areas of wood between said expansion joints to accommodate expansion and contraction of said wood areas as independent units of material, comprising an intermediate ply of plastic material, said structure having a thickness greater than the combined thickness of the paper and veneer plies.

CHARLES N. CONE.

REFERENCES CITED

The following references are of record in the file of this patent:

UNITED STATES PATENTS

| Number | Name | Date |
| --- | --- | --- |
| 1,195,408 | Smith | Aug. 22, 1916 |
| 1,819,775 | Elmendorf | Aug. 18, 1931 |
| 1,902,032 | Horine | Mar. 21, 1933 |
| 1,915,690 | Nichols | June 27, 1933 |
| 2,070,527 | Elmendorf | Feb. 9, 1937 |
| 2,213,249 | Kelley | Sept. 3, 1940 |